Sept. 5, 1933. W. M. TOMASHEK Re. 18,935

BURR PLATE

Original Filed Aug. 15, 1929 2 Sheets-Sheet 1

Inventor
William M. Tomashek

By Browne & Phelps
Attorneys

Sept. 5, 1933. W. M. TOMASHEK Re. 18,935
BURR PLATE
Original Filed Aug. 15, 1929 2 Sheets-Sheet 2
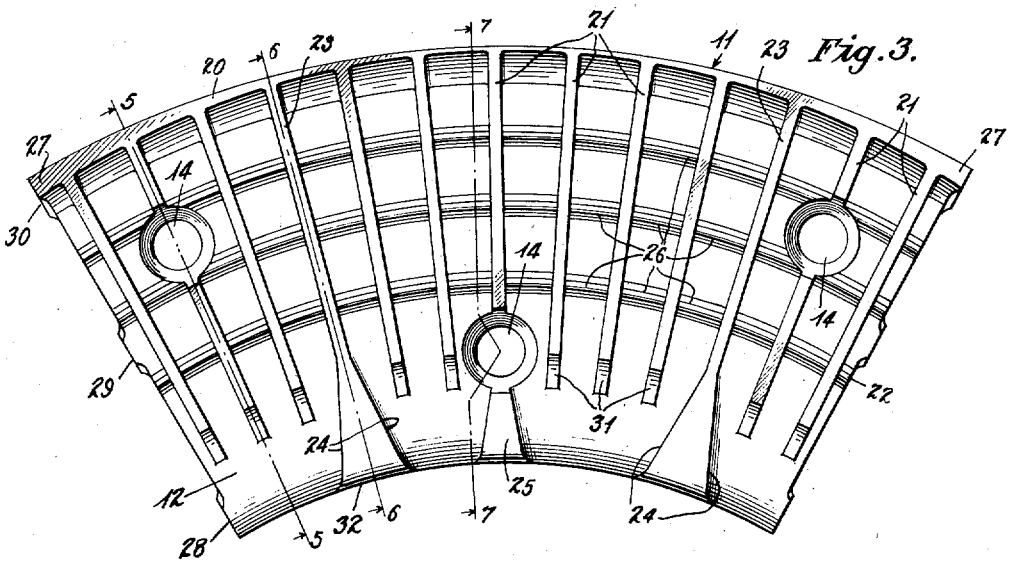
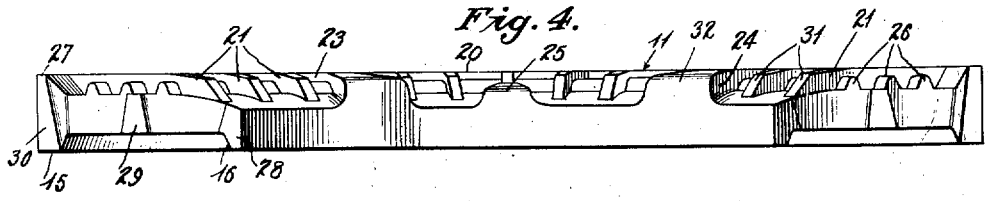
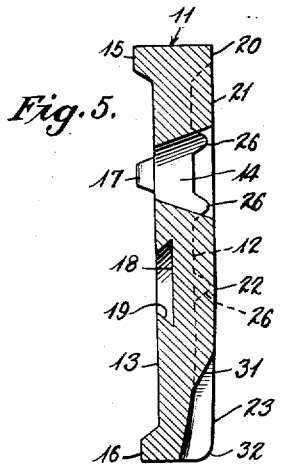
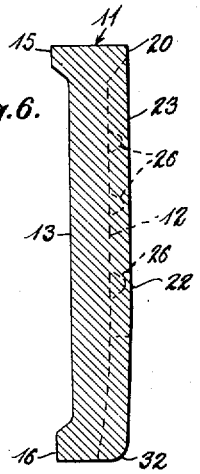
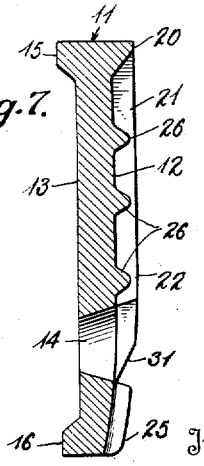
Inventor
William M. Tomashek
By Brown & Phelps
Attorneys Reissued Sept. 5, 1933

Re. 18,935

UNITED STATES PATENT OFFICE 18,935

BURR PLATE

William M. Tomashek, Winona, Minn., assignor to Winona Attrition Mill Company, Winona, Minn., a corporation of Minnesota Original No. 1,782,372, dated November 18, 1930, Serial No. 386,030, August 15, 1929. Application for reissue November 17, 1932. Serial No. 643,117

8 Claims. (Cl. 83—3)

The invention relates to burr plates and has as an object the provision of a plate which will grind grain to a uniform fineness.

It is a further object of the invention to provide a burr plate which will grind grain with less expenditure of power than plates heretofore known.

It is a further object of the invention to provide a burr plate which will grind grain without heating the same.

It is a further object of the invention to provide a plate made up of sections which may be assembled upon a support for use.

It is a further object of the invention to provide a plate made up of sections so formed as to strengthen the portions necessary for greatest strength with the least material.

Further objects of the invention will appear from the following description when read in connection with the accompanying drawings, showing an illustrative embodiment of the invention and wherein:

Fig. 3 is a front elevation of one section;

Fig. 4 is an inside edge view of one section; and

Figure 1:
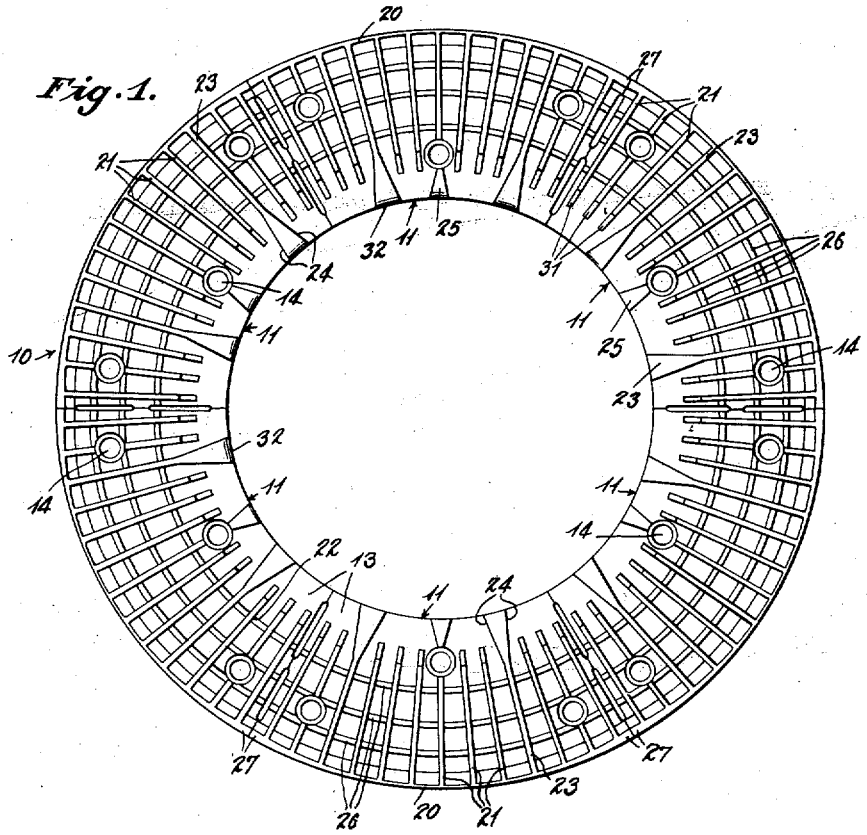
Fig. 1 is an elevation of an assembled plate.

Figs. 5, 6, and 7 are sections taken upon the corresponding lines of Fig. 3.

As shown the assembled plate comprises an annular plate 10 made up of a plurality of like sections 11 as illustrated in Figs. 2 to 7 inclusive. As there shown each section comprises a plate which is a segment of the annulus and presents a front or working surface 12 and a rear surface 13. The sections are designed to be assembled upon a disc or annular support and to be secured thereto by bolts, the heads of which will be received in the tapered openings 14, which bolts will clamp the sections upon the support.

It is to be understood that the said supports will be revolved in opposite directions or one support will be revolved while the other support may be held stationary, two of the assembled annuli 10 being placed in opposed relation and separated to a distance corresponding to the fineness of the product desired, in the manner well understood in the art.

To contact with the support, there is shown a peripheral flange 15 and an inner flange 16 projecting rearwardly from the rear surface of the plate.

To prevent the attaching bolts from deforming the plate, there are shown lugs 17 adjacent the bolt holes 14 which will receive the strain upon the plates as the bolts are tightened.

For the purpose of balancing the assembled annulus into dynamic balance, the rear surface of the plate is shown as provided with cavities 18 and when the plates are assembled in the balancing of the assembly additional material may be drilled out of the cavities for the purpose of removing or adding weight as needed. For the purpose of retaining lead in the cavities, the cavities are preferably made of a dovetail cross section as indicated at 19 in Fig. 5.

The front or working surface of each of sections 12 is shown as formed with a peripheral flange 20 standing above said working surface and with a plurality of radial ribs 21 rising from the surface into the plane of the edge of the peripheral flange 20 and the outer portion of said working surface, of the flange 20 and of the ribs 21, are in planes normal to the axis of the annulus, whereas the inner margin of the working surface from substantially the circumferential line 22 is sloped away from the plane normal to the axis of the annulus, as clearly indicated in Figs. 4 to 7 inclusive.

The surface of the ribs 21 is substantially parallel with the working surface.

The ribs 21 are shown as terminating short of the inner edge of the sections. Interspersed with the ribs 21, there are shown a plurality of ribs 23 which extend to the inner edge of the section and are circumferentially widened at their inner ends as indicated at 24 for the purpose of feeding material to the working surface of the sections and assembled annulus, the outer edge of the ribs 23 and of the widened portions 24 being also substantially parallel with the working surface throughout.

As an additional feeding means, there is shown a boss 25 placed between adjacent widened portions 24 and ribs 23 which is shown as rising to a less height than said widened portions 24, which boss may or may not be exactly in alignment with one of the ribs 21 and is not necessarily centrally placed between the widened portions 24 of the ribs 23.

To control the progress of the feed to the outer periphery of the annulus, there are shown circumferential ribs 26 extending between the ribs 21 and 23, three of such ribs being shown, which ribs rise to a less height than the radial ribs 21 and 23 from the working surface.

By virtue of the presence of the ribs 26 feed will be checked in its outward movement and will be more thoroughly subjected to the shearing action of the relatively oppositely moving radial ribs upon the opposed annuli. The ribs 26 are shown as sloping upwardly from their bases to their apices for better passage of the material thereover and to eliminate crevices and corners in which material would otherwise tend to lodge. The working surface 12 is shown as sloping outwardly and upwardly to the surface of the peripheral flange 20 also to prevent lodging and for the better passage of material to discharge. It is understood that material will be fed through one of the opposed annuli and between the same to the working surfaces where it will be comminuted and will be discharged radially of the plates at the periphery thereof between the opposed edges of the flanges 20.

Since the annulus 10 is made up of sections and since at least one of the annuli as placed in the mill will be revolved at a high rate of speed, the centrifugal strain upon the plates must be resisted by greater strength at the ends of the sections than at the centers, which ends are unsupported since they are not integral with the end of the adjacent section. It is, however, advantageous to construct the edge of the flange 20 as thin as is consistent with the necessary strength in order to reduce friction of the discharging ground product to reduce heating thereof, and to conserve energy. To meet these requirements, the ends 27 of the peripheral flange 20 as well as of the rearwardly projecting peripheral flange 15 are made thicker than the centers thereof, as clearly shown in Figs. 2 and 3.

Figure 2:
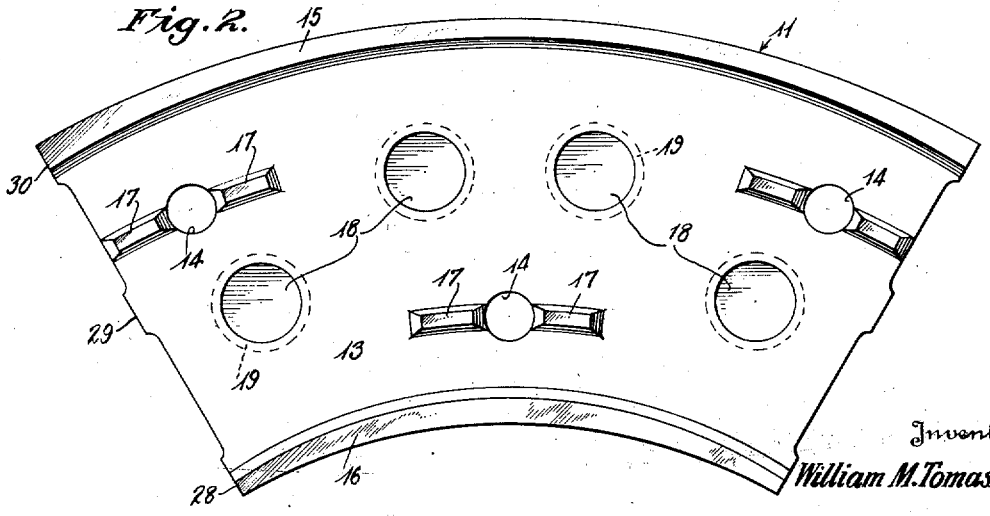
Fig. 2 is a rear elevation of one section on an enlarged scale.

To better preserve dynamic balance, the difference in thickness of the peripheral flanges 15 and 20 is compensated for by thickening the inner flange 16 at the center portion upon each section, as clearly indicated in Fig. 2.

For convenience in fitting the sections together at their ends, they are shown as formed with projecting portions 28, 29, 30, the surfaces of which may be ground to cause the assembled plates to accurately fit into a true annulus.

The ends of ribs 21 are shown as sloping outwardly away from the working surface 12 as at 31 and the inner ends of the widened portions 24 of ribs 23 are shown rounded as at 32, all for the purpose of facilitating a uniform and even flow of grain through the burrs.

It is found that attention to each of the details of the plate as described results in the production of an attrition burr which will grind a considerable greater percentage of grain with the same power than any plate which applicant in a long experience has known and that the ground material leaving the plate is heated very little and to a markedly less extent than is the case with former known mills. The heat which has formerly been produced in the grinding of material is obviously a waste of energy as well as being in many instances injurious to the material. In addition to the named advantage the product ground by the plates of the invention is of a uniform lineness, being devoid of any considerable portion of powder.

Minor changes may be made in the physical embodiment of the invention within the scope of the appended claims without departing from the spirit of the invention.

I claim:

1. A burr plate comprising an annular member comprising a plurality of radially separate sections, each section formed with a peripheral flange relatively thin at the center of the circumferential extent of the section and thickened at the ends thereof, the working surface of the section sloping outwardly to the edge of the flange, a plurality of relatively closely spaced radial ribs flush with the edge of said flange and terminating short of the inner edge of the section interspersed by other radial ribs of like height extending to the said inner edge and widened at their inner ends and a plurality of circumferential ribs extending between said radial ribs and of less height than the radial ribs.

2. A burr plate comprising an annular plate comprising a plurality of radially separate sections, each section formed with a peripheral flange relatively thin at the central portion of the circumferential extent of the section and widened at the ends thereof, the working surface of the section sloping outwardly adjacent the flange to the edge thereof, the central and outer portions of the working surface of the said section radially thereof lying in a plane normal to the axis of the annulus and the inner portion sloping away from said plane, a plurality of radial ribs rising above said working surface flush with said flange, certain of said ribs terminating short of the inner edge of the section and others thereof interspersed with said certain ribs extending to said inner edge, said extended ribs widened at their inner ends circumferentially of the section, the free edges of said working surface and a plurality of circumferential ribs extending between and of less height than said radial ribs.

3. A burr plate comprising an annular member comprising a plurality of radially separate sections assembled on a revoluble support, each section formed with a peripheral flange projecting from the working and from the rear surface of the section, said flange being relatively thin at the center circumferentially of the section and thickened at the ends thereof, also formed with a flange at its inner edge extending above its rear surface, said last named flange thickened at its central portion and with bolt receiving openings and a lug adjacent each opening rising to the plane of the rear edge of said flanges, a plurality of radial ribs rising from the working surface of each section flush with the edge of said peripheral flange, certain of said ribs terminating short of the inner edge of the section and others of said ribs interspersed with said certain ribs extending to said inner edge and circumferentially widened adjacent said edge.

4. A burr plate comprising a series of segments mounted end to end in annular formation upon a revoluble support, said segments each having an outer flange heavier toward its ends than at its intermediate portion, and grinding ribs extending from the working surface of the segment.

5. A burr plate comprising a series of segments mounted end to end in annular formation upon a revoluble support, said segments each having an outer flange heavier toward its ends than at its intermediate portion, and grinding ribs extending from the working surface of the segment, said segments having spaced end lugs adapted to be machined for abutting contact to permit accurate fitting of the segments into a true annulus.

6. A burr plate comprising an annular member formed of a plurality of radially separated sections having grinding faces on one side and assembled on a revolvable support, each section having an integral peripheral face flange adjacent its outer edge and an integral reinforcing back flange adjacent its inner edge, a plurality of radial ribs on the face of each section and terminating at their outer ends flush with said peripheral face flange, and a plurality of other ribs connecting the radial ribs and of less height than the latter, and certain of said radial ribs having circumferentially widened inner ends, said peripheral face flange of each section being narrower at its intermediate portion than toward its ends.

7. A burr plate comprising a series of segments mounted end to end in annular formation upon a revoluble support, said segments each having an outer flange heavier toward its ends than at its intermediate portion, and grinding ribs extending radially inwardly from said flange, means for retarding the flow of material to be ground outwardly between said radial ribs, certain of said ribs being longer than others and having their inner ends widened, the surface of the segment intermediate said widened ribs being sloped back from the plane of the surface proper.

8. A burr plate comprising an annular member comprising a plurality of radially separate sections assembled on a revoluble support, each section formed with a peripheral flange projecting from the working and from the rear surface of the section, said flange being relatively thin at the center circumferentially of the section and thickened at the ends thereof, also formed with a flange at its inner edge extending above its rear surface, a plurality of radial ribs rising from the working surface of each section flush with the edge of said peripheral flange, certain of said ribs terminating short of the inner edge of the section and others of said ribs intespersed with said certain ribs extending to said inner edge and circumferentially widened adjacent said edge.

WILLIAM M. TOMASHEK.